United States Patent [19]
Rosenberg

[11] Patent Number: 6,088,019
[45] Date of Patent: Jul. 11, 2000

[54] LOW COST FORCE FEEDBACK DEVICE WITH ACTUATOR FOR NON-PRIMARY AXIS

[75] Inventor: Louis B. Rosenberg, San Jose, Calif.

[73] Assignee: Immersion Corporation, San Jose, Calif.

[21] Appl. No.: 09/103,281

[22] Filed: Jun. 23, 1998

[51] Int. Cl.[7] ....................................................... G09G 5/00
[52] U.S. Cl. ................................................................ 345/156
[58] Field of Search .................................... 345/156, 157, 345/161, 163

[56] References Cited

U.S. PATENT DOCUMENTS

| | | | |
|---|---|---|---|
| 3,875,488 | 4/1975 | Crocker et al. | 318/648 |
| 3,919,691 | 11/1975 | Noll | 340/172.5 |
| 4,436,188 | 3/1984 | Jones | 188/378 |
| 4,477,043 | 10/1984 | Repperger | 244/223 |
| 4,604,016 | 8/1986 | Joyce | 474/7 |
| 4,782,327 | 11/1988 | Kley et al. | 340/365 |
| 4,794,384 | 12/1988 | Jackson | 340/710 |
| 4,795,296 | 1/1989 | Jau | 414/5 |
| 4,800,721 | 1/1989 | Cemenska et al. | 60/393 |
| 4,839,838 | 6/1989 | LaBiche et al. | 364/709.11 |
| 4,861,269 | 8/1989 | Meenen, Jr. | 434/45 |
| 4,868,549 | 9/1989 | Affinito et al. | 340/710 |
| 4,896,554 | 1/1990 | Culver | 74/471 |
| 4,906,843 | 3/1990 | Jones et al. | 250/221 |
| 4,935,728 | 6/1990 | Kley | 340/709 |
| 4,949,119 | 8/1990 | Moncrief et al. | 364/578 |
| 4,961,038 | 10/1990 | MacMinn | 318/696 |
| 4,983,901 | 1/1991 | Lehmer | 318/685 |
| 5,044,956 | 9/1991 | Behensky et al. | 434/45 |
| 5,065,145 | 11/1991 | Purcell | 340/706 |
| 5,076,517 | 12/1991 | Ferranti et al. | 244/228 |
| 5,095,303 | 3/1992 | Clark et al. | 340/710 |
| 5,103,404 | 4/1992 | McIntosh | 318/568.22 |
| 5,107,080 | 4/1992 | Rosen | 200/6 |

(List continued on next page.)

FOREIGN PATENT DOCUMENTS

| | | |
|---|---|---|
| 0085518A1 | 1/1983 | European Pat. Off. . |
| 0626634A2 | 11/1994 | European Pat. Off. . |
| 875819 | 4/1998 | European Pat. Off. .......... G06F 3/00 |
| 95/20788 | 8/1995 | WIPO ................................. G06F 3/00 |
| 95/32459 | 11/1995 | WIPO ................................. G06F 3/00 |
| 97/21160 | 6/1997 | WIPO . |
| 97/31333 | 8/1997 | WIPO . |

OTHER PUBLICATIONS

Ramstein et al., "The Pantograph: A Large Workspace Haptic Device for a Multimodal Human–Computer Interaction," Computer–Human Interaction, CHI 1994, pp. 1–3.

Buttolo et al., "Pen–based force Display for Precision Manipulation in Virtual Environments," IEEE 0–8186–7084–3, 1995, pp. 217–224.

(List continued on next page.)

*Primary Examiner*—Richard A. Hjerpe
*Assistant Examiner*—Ronald Laneau
*Attorney, Agent, or Firm*—James R. Riegel

[57] ABSTRACT

A force feedback interface and method including an actuator in a non-primary axis or degree of freedom. The force feedback interface device is connected to a host computer that implements a host application program or graphical environment. The interface device includes a user manipulatable object, a sensor for detecting movement of the user object, and an actuator to apply output forces to the user object. The actuator outputs a linear force on the user object in non-primary linear axis or degree of freedom that is not used to control a graphical object or entity implemented by the host computer, and movement in the non-primary degree of freedom is preferably not sensed by sensors. The axis extends through the user object, and there are preferably no other actuators in the device, thus allowing the force feedback device to be very cost effective. Force sensations such as a jolt, vibration, a constant force, and a texture force can be output on the user object with the actuator. The force sensations can be output in a direction perpendicular to a planar degree of freedom, radial to spherical degree of freedom, and/or along a lengthwise axis of the user object.

45 Claims, 5 Drawing Sheets

U.S. PATENT DOCUMENTS

| | | | |
|---|---|---|---|
| 5,107,262 | 4/1992 | Cadoz et al. | 341/22 |
| 5,116,180 | 5/1992 | Fung et al. | 414/5 |
| 5,139,261 | 8/1992 | Openiano | 273/148 |
| 5,146,566 | 9/1992 | Hollis, Jr. et al. | 395/275 |
| 5,184,319 | 2/1993 | Kramer | 364/806 |
| 5,185,561 | 2/1993 | Good et al. | 318/432 |
| 5,186,629 | 2/1993 | Rohen | 434/114 |
| 5,189,355 | 2/1993 | Larkins et al. | 318/685 |
| 5,193,963 | 3/1993 | McAffee et al. | 414/5 |
| 5,197,003 | 3/1993 | Moncrief et al. | 364/410 |
| 5,203,563 | 4/1993 | Loper, III | 273/148 |
| 5,220,260 | 6/1993 | Schuler | 318/561 |
| 5,223,776 | 6/1993 | Radke et al. | 318/568.1 |
| 5,235,868 | 8/1993 | Culver | 74/471 |
| 5,264,768 | 11/1993 | Gregory et al. | 318/561 |
| 5,275,565 | 1/1994 | Moncrief | 434/29 |
| 5,286,203 | 2/1994 | Fuller et al. | 434/45 |
| 5,296,871 | 3/1994 | Paley | 345/163 |
| 5,313,230 | 5/1994 | Venolia et al. | 345/163 |
| 5,354,162 | 10/1994 | Burdea et al. | 414/5 |
| 5,355,148 | 10/1994 | Anderson | 345/166 |
| 5,381,080 | 1/1995 | Schnell et al. | 318/566 |
| 5,396,266 | 3/1995 | Brimhall | 345/161 |
| 5,398,044 | 3/1995 | Hill | 345/145 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,457,479 | 10/1995 | Cheng | 345/163 |
| 5,459,382 | 10/1995 | Jacobus et al. | 318/568.11 |
| 5,471,571 | 11/1995 | Smith et al. | 395/137 |
| 5,473,235 | 12/1995 | Lance et al. | 318/561 |
| 5,473,344 | 12/1995 | Bacon et al. | 345/163 |
| 5,491,477 | 2/1996 | Clark et al. | 341/20 |
| 5,512,919 | 4/1996 | Araki | 345/156 |
| 5,513,100 | 4/1996 | Parker et al. | 364/167.01 |
| 5,530,455 | 6/1996 | Gillick et al. | 345/163 |
| 5,565,887 | 10/1996 | McCambridge et al. | 345/145 |
| 5,576,727 | 11/1996 | Rosenberg et al. | 345/179 |
| 5,583,407 | 12/1996 | Yamaguchi | 318/551 |
| 5,589,828 | 12/1996 | Armstrong | 345/161 |
| 5,589,854 | 12/1996 | Tsai | 345/161 |
| 5,596,347 | 1/1997 | Robertson et al. | 345/145 |
| 5,625,576 | 4/1997 | Massie et al. | 364/578 |
| 5,642,469 | 6/1997 | Hannaford et al. | 395/99 |
| 5,643,087 | 7/1997 | Marcus et al. | 463/38 |
| 5,656,901 | 8/1997 | Kurita | 318/436 |
| 5,666,138 | 9/1997 | Culver | 345/161 |
| 5,666,473 | 9/1997 | Wallace | 345/420 |
| 5,691,747 | 11/1997 | Amano | 345/167 |
| 5,691,898 | 11/1997 | Rosenberg et al. | 364/190 |
| 5,694,013 | 12/1997 | Stewart et al. | 345/156 |
| 5,709,219 | 1/1998 | Chen et al. | 128/782 |
| 5,714,978 | 2/1998 | Yamanaka | 345/157 |
| 5,721,566 | 2/1998 | Rosenberg et al. | 345/161 |
| 5,724,278 | 3/1998 | Chen et al. | 345/156 |
| 5,734,373 | 3/1998 | Rosenberg et al. | 345/161 |
| 5,736,978 | 4/1998 | Hasser et al. | 345/173 |
| 5,745,715 | 4/1998 | Pickover et al. | 395/348 |
| 5,754,023 | 5/1998 | Rosten et al. | 318/561 |
| 5,755,577 | 5/1998 | Gillio | 434/262 |
| 5,757,358 | 5/1998 | Osga | 345/146 |
| 5,760,764 | 6/1998 | Martinelli | 345/160 |
| 5,767,839 | 6/1998 | Rosenberg | 345/161 |
| 5,771,037 | 6/1998 | Jackson | 345/157 |
| 5,781,172 | 7/1998 | Engel et al. | 345/164 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,805,165 | 9/1998 | Thorne, III et al. | 345/348 |
| 5,808,601 | 9/1998 | Leah et al. | 345/145 |
| 5,808,603 | 9/1998 | Chen | 345/157 |
| 5,823,876 | 10/1998 | Unbehand | 463/37 |
| 5,825,308 | 10/1998 | Rosenberg | 341/20 |
| 5,831,408 | 11/1998 | Jacobus et al. | 318/568.11 |
| 5,844,392 | 12/1998 | Peurach et al. | 318/568.17 |
| 5,877,748 | 3/1999 | Redlich | 345/163 |
| 5,880,714 | 3/1999 | Rosenberg et al. | 345/156 |
| 5,889,670 | 3/1999 | Schuler et al. | 364/186 |
| 5,912,661 | 6/1999 | Siddiqui | 345/166 |
| 5,944,151 | 8/1999 | Jakobs et al. | 188/267.1 |
| 5,956,484 | 9/1999 | Rosenberg et al. | 395/200.33 |
| 5,959,613 | 9/1999 | Rosenberg et al. | 345/161 |
| 5,990,869 | 11/1999 | Kubica et al. | 345/163 |

OTHER PUBLICATIONS

Hannaford et al., "Force–Feedback Cursor Control," NASA Tech Briefs, vol. 13, No. 11, 1989, pp. 1–7.

Rosenberg et al., "The use of force feedback to enhance graphical user intefaces," Stereoscopic Displays & Virtual Reality Systems, 1996, pp. 243–248.

Munch et al., "Intelligent Control for Haptic Displays," Eurographics '96, vol. 15, No. 3, 1996, pp. 217–226.

Rosenberg et al., "Commercially Viable force feedback Controller for Individuals with Neuromotor Disabilities," Armstrong Laboratory, AL/CF–TR–1997–0016, 1996, pp., 1–33.

Brooks, Jr. et al., "Project GROPE, Haptic Displays for Scientific Visualization,", Computer Graphics, vol. 24, #4, 1990, pp. 177–184.

Batter et al., "Grope–1: A computer Display to the sense of Feel," Proc. IFIP Congress, 1971, pp. 759–763.

Gotow et al., "Perception of Mechanical Properties at the Man–Machine Interface," IEEE CH2503–1, 1987, pp. 688–690.

Howe et al., "Task Performance w/ a dextrous Teleoperated Hand System," Proc. of SPIE, vol. 1833, 1992, pp. 1–9.

Atkinson et al., "Computing with Feeling,", Comput. & Graphics, vol. 2, 1977, pp. 97–103.

Minsky et al., "Feeling & Seeing:Issues in Force Display," ACM089791–351–5, 1990, pp. 235–242, 270.

Ouh–Young, Ming, "Force Display in Molecular Docking," Dissertation for University of N. Carolina, 1990, pp. 1–42.

Iwata, Hiroo, "Pen–based Haptic Virtual Environment," IEEE 0–7803–1363–1, 1993, pp. 287–292.

Adelstein et al., "Design & Implementation of a Force Reflecting Manipulandum for Manual Control Research," 1992, NASA—Ames Research Center and MIT, pp. 1–26.

Millman et al., "Design of a 4 Degree of Freedom Force–Reflecting Manipulandum with a Specified Force/Torque Workspace," IEEE CH2969–4, 1991, pp. 1488–1493.

Hannaford et al., "Performance Evaluation of a 6–Axis Generalized Force–Reflecting Teleoperator," IEEE Transactions on Systems, Man, and Cybernetics, vol. 21, No. 3, 1991, pp. 621–623, 631–633.

Winey III, "Computer Simulated Visual & Tactile Feedback as an Aid to Manipulator & Vehicle Control," MIT, 1981, pp. 1–79.

Colgate et al., "Implementation of Stiff Virtual Walls in Force–Reflecting Interfaces," Northwestern University, IL, 1993., pp. 1–8.

Hirota et al., "Development of Surface Display," IEEE 0–7803–1363–1, 1993, pp. 256–262.

Rosenberg, "Perceptual Design of a Virtual Rigid Surface Contact," Armstrong Laboratory AL/CF–TR–1995–0029, 1993, pp. 1–45.

Iwata et al., "Artificial Reality w/ Force–Feedback: Development of Desktop Virtual Space with Compact Master Manipulator," Computer Graphics, vol. 24, No. 4, 1990, pp. 165–170.

Russo, "The Deisgn & Implementation of a 3–Degree–of–Freedom Force Ouput Joystick," Dept. of Mech. Engineering, 1990, pp. 1–42.

Rosenberg, L., "Virtual fixtures as tools to enhance operator performance in telepresence environments," SPIE Manipulator Technology, 1993, pp. 1–12.

Rosenberg et al., "Perceptual Decomposition of Virtual Haptic Surfaces," Proc. IEEE Symposium on Research Frontiers in Virtual Reality, 1993, pp. 1–8.

Ouh–Young et al., "Creating an Illusion of Feel: Control Issues in Force Display," Univ. of N. Carolina, 1989, pp. 1–14.

Yokokoji et al., "What you can see is what you can feel," IEEE 0–8186–7295–1, 1996, pp. 46–54.

Rosenberg et al., "A Force Feedback Programming Primer," Immersion Corp., 1997, pp. 1–176.

Kilpatrick et al., "The Use of Kinesthetic Supplement in an Interactive Graphics System," University of North Carolina, 1976, pp. 1–172.

Kelley et al., MagicMouse: Tactile and Kinesthetic Feedback in the Human–Computer Interface using an Electromagnetically Actuated Input/Output Device, Oct. 19, 1993 University of British Columbia pp. 1–27.

Kelley et al., On the Development of a Force–Feedback Mouse and its Integration into a graphical user Interface, Nov. 1994, Engineering Congress and Exhibition, pp. 1–8.

Christophe Ramstein, Combining Haptic & Braille Technologies: Design Issues and Pilot Study, 96, Siggraph pp. 37–44.

Payette et al., Evaluation of a Force Feedback (Haptic) Computer Pointing Device in Zero Gravity, Oct. 17, 1996, ASME Dynamics Systems, vol. 58 pp. 547–553.

Wiker et al., Development of Tactile Mice for Blind Access to Computers, Importance of Stimulation Locus, Object Size, and Vibrotactile Display Resolution, 1991, Human Factors Society Mtg., pp. 708–712.

Ellis et al., Design & Evaluation of a High–Performance Prototype Planar Haptic Interface, Dec. 1993, Advances in Robotics, 55–64.

Schmult et al., Application Areas for a Force–Feedback Joystick, 1993, Advances in Robotics, vol. 49, pp. 47–54.

Adachi et al., Sensory Evaluation of Virtual Haptic Push–Buttons, 1994, Suzuki Motor Corp., pp. 1–7.

Akamatsu et al., Multimodal Mouse: A Mouse–Type Device with Tactile and Force Display, 1994, Presence vol. 3, pp. 73–80.

Su et al., The Virtual Panel Architecture: A 3D Gesture Framework, University of Maryland, pp. 387–393.

LOW COST FORCE FEEDBACK DEVICE WITH ACTUATOR FOR NON-PRIMARY AXIS

BACKGROUND OF THE INVENTION

The present invention relates generally to interface devices for allowing humans to interface with computer systems, and more particularly to computer interface devices that allow the user to provide input to computer systems and allow computer systems to provide force feedback to the user.

A computer system in typical usage by a user displays a visual environment on a display output device. Using an interface device, the user can interact with the displayed environment to perform functions and tasks on the computer, such as playing a game, experiencing a simulation or virtual reality environment, using a computer aided design system, operating a graphical user interface (GUI), etc. Common human-computer interface devices used for such interaction include a joystick, mouse, trackball, steering wheel, stylus, tablet, pressure-sensitive sphere, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer. For example, the computer displays a cursor or other graphical object in a graphical environment, where the location of the cursor is responsive to the motion of the user object.

In some interface devices, tactile and/or haptic feedback is also provided to the user, more generally known as "force feedback." These types of interface devices can provide physical sensations which are felt by the user manipulating a user manipulatable object of the interface device. For example, the Force-FX joystick controller from CH Products, Inc. and Immersion Corporation may be connected to a computer and provides forces in the degrees of freedom of motion of the joystick to a user of the controller. One or more motors or other actuators are coupled to the joystick and are connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user. Other force feedback controllers include a force feedback mouse that provides forces in the degrees of freedom of motion of the mouse, and a steering wheel controller outputting forces in the rotary degree of freedom of the wheel.

One problem with current force feedback controllers in the home consumer market is the high manufacturing cost of such devices, which makes the devices expensive for the consumer. A large part of this manufacturing expense is due to the inclusion of multiple actuators and corresponding control electronics in the force feedback device. In addition, high quality transmission components such as linkages and bearings must be provided to accurately transmit forces from the actuators to the user manipulandum and to allow accurate sensing of the motion of the user object. These components are complex and require greater precision in their manufacture than many of the other components in an interface device, and thus further add to the cost of the device. A need therefore exists for a force feedback device that is lower in cost to manufacture yet offers the user force feedback to enhance the interaction with a computer application.

SUMMARY OF THE INVENTION

The present invention is directed to a low-cost force feedback interface which provides a linear actuator along a non-primary axis or degree of freedom. This configuration can provide a simpler, lower cost force feedback device, especially when motion in the non-primary axis is not sensed and no other actuators are used.

More specifically, the present invention relates to a force feedback interface device that is coupled to a host computer system which implements a host application program. The interface device includes a user manipulatable object, such as a mouse or joystick, contacted by a user and movable in physical space in at least one primary degree of freedom. At least one sensor detects the movement of the user object in the degree of freedom and outputs sensor signals representative of the movement. An actuator is coupled to the user manipulatable object and applies a linear output force along a non-primary axis extending through the user manipulatable object, where the force is output in a degree of freedom not sensed by the sensor. Preferably, there are no other actuators in the device. Force sensations such as a jolt, vibration, a constant force, and a texture force can be output on the user object with the actuator.

In preferred embodiments, the actuator outputs the force directly on the user manipulatable object, such that no transmission system is required to be provided between the actuator and the user manipulatable object, thus greatly reducing the cost of the device. In addition, the actuator can include a physical spring or other spring device for biasing said at least a portion of the user manipulatable object toward an extended position. The actuator can take a variety of forms, such as a linear voice coil actuator, a linear solenoid, or a voice magnet. A microprocessor local to the interface device can be provided to receive host commands from the host computer and output force signals to the actuator for controlling the output force on the user object. The microprocessor can receive sensor signals from the sensors and report locative data to the host computer indicative of the movement of the user object. Alternatively, a sensor can be coupled to the actuator to determine a position of the user manipulatable object in the degree of freedom of the actuator.

In one embodiment in which the user manipulatable object is moved in a planar degree of freedom, the output force of the actuator can be provided in a direction approximately perpendicular to the plane of motion. For example, in a mouse embodiment, the force is applied about perpendicularly to the planar mouse workspace and is applied to an entire portion of the mouse that is grasped or rested upon by the user's hand. In a particular mouse embodiment, the actuator is coupled to a housing of the mouse and moves a portion of the housing in the perpendicular direction. Such a moveable portion of the housing can be a cover portion of the housing that is movably coupled to a base portion of the housing, for example by a hinge, where the cover portion is moved by the actuator with respect to the base portion. The output force can be correlated with a graphical representation displayed by the host computer, where a position of the mouse in the planar workspace corresponds with a position of a cursor displayed in the graphical representation. For example, a jolt force can be output when the mouse crosses a boundary of a window or icon. Or, the output force can be correlated with an elevation of a portion of a 3-D graphical representation having different elevations on which the cursor is displayed. In a different embodiment, the user manipulatable object can be a stylus; or a wheel, such as a steering wheel, that rotates in the single plane, and where the axis extends approximately through a center of the wheel.

In a different embodiment, the user manipulatable object is moved in two sensed rotary degrees of freedom with respect to a ground, where the degrees of freedom approximately define a portion of a surface of a sphere. For example, the user manipulatable object can be at least a portion of a joystick handle that is typically moved in such rotary degrees of freedom. The actuator of the device applies an output force in a linear degree of freedom that is approximately radial to the sphere, where preferably no force is output in the two primary sensed degrees of freedom. The force is applied along a lengthwise axis of the user manipulatable object.

In another embodiment, the user manipulatable object is movable in physical space in a plurality of degrees of freedom with respect to a ground, and a linear actuator applies a linear output force only along a lengthwise axis of the user manipulatable object and not in the plurality of degrees of freedom. One such embodiment provides a stylus as a user manipulatable object, where the sensor can be included in a tablet which is contacted by the stylus. In one embodiment, the stylus includes a rigid tip for contact with the tablet, where the actuator outputs a force to move a body portion of the stylus relative to a tip portion of the stylus. In a different stylus embodiment, the stylus includes a ball in a tip of the stylus, where the ball rotates in place when the stylus is moved across a surface. The actuator can force a brake pad against the ball to output a resistive force on the stylus.

The present invention advantageously provides a force feedback device that is significantly lower in cost than other types of force feedback devices and is thus quite suitable for home consumer applications. A single actuator can be provided that directly applies force to the user manipulatable object, thus saving cost by the elimination of multiple actuators and complex force transmission and control systems. The actuator does not output force in a main sensed degree of freedom of the device, thus allowing sensors to read the position of the user object without substantial interference from forces and also simplifying the control of output forces. Furthermore, the actuator of the present invention can provide a variety of different types of force sensations to enhance the user's experience and interface with a computer application.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
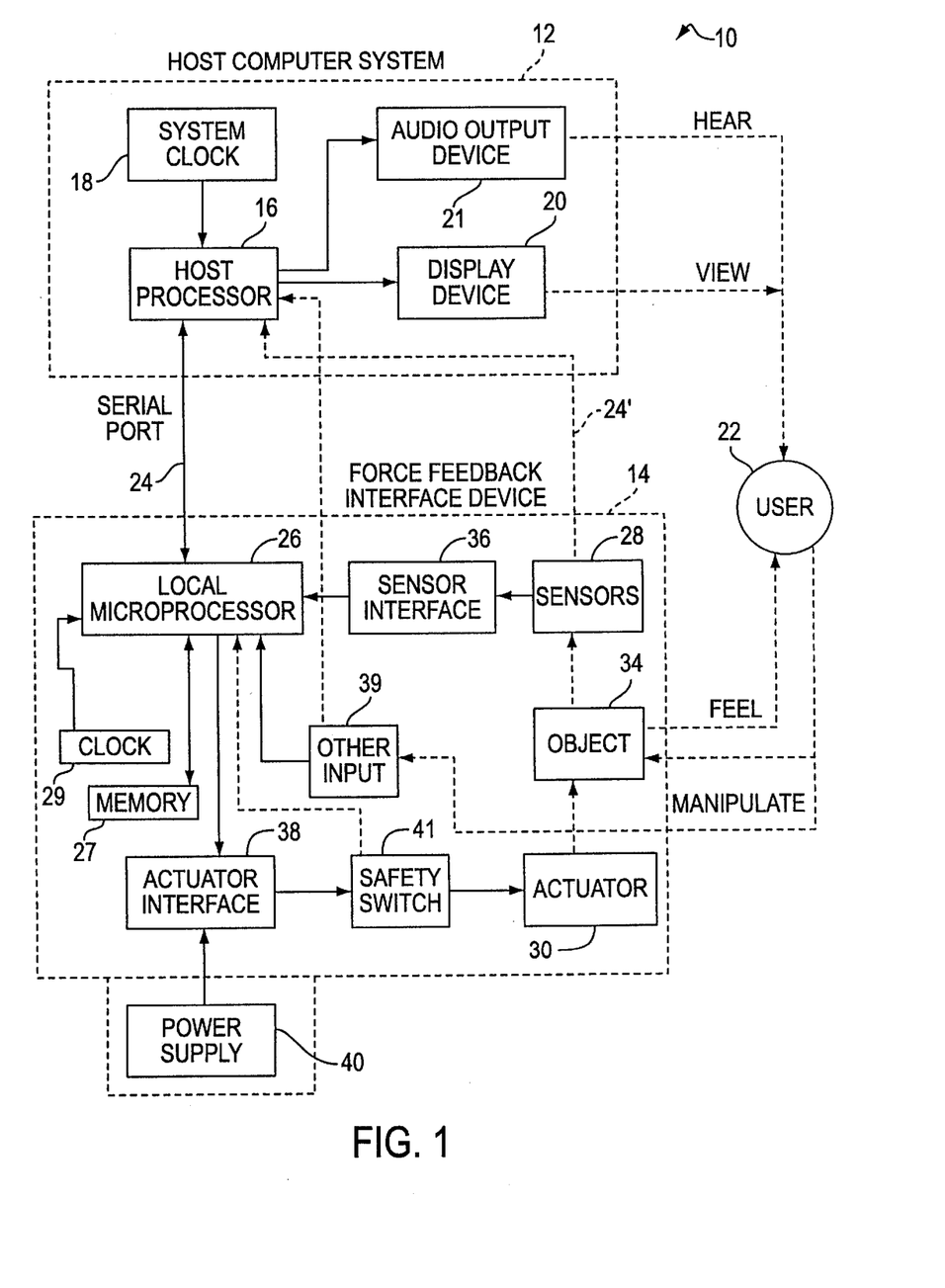
FIG. 1 is a block diagram of a system including a host computer and a force feedback interface device of the present invention.

FIG. 1 is a block diagram illustrating a force feedback interface system 10 of the present invention controlled by a host computer system. Interface system 10 includes a host computer system 12 and an interface device 14.

Host computer system 12 is preferably a personal computer, such as a Pentium-class (IBM-compatible) PC or Macintosh personal computer, or a workstation, such as a SUN or Silicon Graphics workstation. For example, the host computer system can a personal computer which operates under the Windows, MS-DOS, or Linux operating systems. Alternatively, host computer system 12 can be one of a variety of home video game systems commonly connected to a television set, such as systems available from Nintendo, Sega, or Sony. In other embodiments, home computer system 12 can be a television "set top box" or a "network computer" which can be used, for example, to provide interactive computer functions to users over networks, or other appliance having computer functions.

In the described embodiment, host computer system 12 implements a host application program with which a user 22 is interacting via peripherals and interface device 14. For example, the host application program can be a video game, web browser, scientific analysis program, operating system, graphical user interface, medical simulation, or other application program that utilizes force feedback. Typically, the host application provides images to be displayed on a display output device, as described below, and/or other feedback, such as auditory signals. The application program and host computer provide a graphical environment with which the user may interact. For example, the graphical environment may display graphical objects, such as icons, windows, or 3-D objects; or entities, such as a player-controlled simulated vehicle or character.

Host computer system 12 preferably includes a host microprocessor 16, a clock 18, a display screen 20, and an audio output device 21. The host computer also includes other well known components, such as random access memory (RAM), read-only memory (ROM), and input/output (I/O) electronics (not shown). Host microprocessor 16 can include a variety of available microprocessors from Intel, AMD, Cyrix, Motorola, or other manufacturers. Microprocessor 16 can be single microprocessor chip, or can include multiple primary and/or co-processors. Microprocessor preferably retrieves and stores instructions and other necessary data from RAM and ROM, as is well known to those skilled in the art. In the described embodiment, host computer system 12 can receive locative data or a sensor signal via a bus 24 from sensors of interface device 14 and other information. Microprocessor 16 can receive data from bus 24 using I/O electronics 21, and can use I/O electronics to control other peripheral devices. Host computer system 12 can also output a command to interface device 14 via bus 24 to cause force feedback for the interface device. Clock 18 is a standard clock crystal or equivalent component used by host computer system 12 to provide timing to electrical signals used by microprocessor 16 and other components of the computer system.

Display screen 20 is coupled to host microprocessor 16 by suitable display drivers and can be used to display images generated by host computer system 12 or other computer systems. Display screen 20 can be a standard display screen, CRT, flat-panel display, 3-D goggles, or any other visual interface. In a described embodiment, display screen 20 displays images of a simulation, game environment, operating system application, etc. For example, images describing a point of view from a first-person perspective can be displayed, as in a virtual reality simulation or game. Or, images describing a third-person isometric perspective of objects, backgrounds, etc., or a 2-D image of a graphical user interface can be displayed. User 22 of the host computer 12 and interface device 14 can receive visual feedback by viewing display screen 20. Herein, computer 12 may be referred as displaying computer or graphical "objects" or "entities". These computer objects are not physical objects, but is a logical software unit collections of data and/or procedures that may be displayed as images by computer 12 on display screen 20, as is well known to those skilled in the art.

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires, wireless connection, or other connections and that can be implemented in a variety of ways. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art. For example, the USB standard provides a relatively high speed serial interface that can provide force feedback signals in the present invention with a high degree of realism. An advantage of the microprocessor-enabled local control of system 10 is that low-bandwidth serial communication signals can be used to interface with interface device 14, thus allowing a standard built-in serial interface of many computers to be used as bus 24. Alternatively, a parallel port of host computer system 12 can be coupled to a parallel bus 24 and use a parallel protocol, such as SCSI or PC Parallel Printer Bus. Also, bus 24 can be connected directly to a data bus of host computer system 12 using, for example, a plug-in card and slot or other access of computer 12. Bus 24 can be implemented within a network such as the Internet or a LAN; or, bus 24 can be a channel such as the air, etc. for wireless communication. In another embodiment, one or more additional buses can be included to communicate between host computer system 12 and interface device 14 for an increased data bandwidth.

Interface device 14 includes a local microprocessor 26, sensors 28, actuator 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 can optionally be included within the housing of interface device 14 to allow efficient communication with other components of the interface device. Processor 26 is considered local to interface device 14, where "local" herein refers to processor 26 being a separate microprocessor from any processors in host computer system 12. "Local" also preferably refers to processor 26 being dedicated to force feedback and sensor I/O of interface device 14, and preferably being closely coupled to sensors 28 and actuators 30, such as within the housing for interface device or in a housing coupled closely to interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips. In other embodiments, microprocessor 26 can include digital signal processor (DSP) capability.

Microprocessor 26 can receive signals from sensors 28 and provide signals to actuator 30 of the interface device 14 in accordance with instructions provided by host computer 12 over bus 24. For example, in a local control embodiment, host computer 12 provides high level supervisory commands to microprocessor 26 over bus 24, and microprocessor 26 manages low level force control loops to sensors and the actuator in accordance with the high level commands and independently of the host computer 18. This operation is described in greater detail in U.S. Pat. Nos. 5,739,811 and 5,734,373, both incorporated by reference herein. In the host control loop, force commands are output from the host computer to microprocessor 26 and instruct the microprocessor to output a force or force sensation having specified characteristics. The local microprocessor 26 reports data to the host computer, such as locative data that describes the position of the user object 34 in one or more provided degrees of freedom. The data can also describe the states of buttons 39 and safety switch 41. The host computer uses the data to update executed programs. In the local control loop, actuator signals are provided from the microprocessor 26 to actuator 30 and sensor signals are provided from the sensors 28 and other input devices 39 to the microprocessor 26. Herein, the term "force sensation" refers to either a single force or a sequence of forces output by the actuators 30 which provide a sensation to the user. For example, vibrations, a single jolt, or a spring force are all considered force sensations. The microprocessor 26 can process inputted sensor signals to determine appropriate output actuator signals by following stored instructions. The force process can command distinct force sensations, such as vibrations, textures, jolts, or even simulated interactions between displayed objects. The sensors 28 provide sensor signals to the microprocessor 26 indicating a position (or other information) of the user object in degrees of freedom. The microprocessor may use the sensor signals in the local determination of forces to be output on the user object, as well as reporting locative data derived from the sensor signals to the host computer.

In yet other embodiments, other hardware can be provided locally to interface device 14 to provide functionality similar to microprocessor 26. For example, a hardware state machine incorporating fixed logic can be used to provide signals to the actuator 30 and receive sensor signals from sensors 28, and to output force signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 12 can provide low-level force commands over bus 24, which are directly transmitted to the actuator 30. Host computer 12 thus directly controls and processes all signals to and from the interface device 14, e.g. the host computer directly controls the forces output by actuator 30 and directly receives sensor signals from sensors 28 and input devices 39. This embodiment may be desirable to reduce the cost of the force feedback device yet further, since no local microprocessor 26 need be included. Furthermore, since only one actuator 30 can be used with forces not provided in the primary sensed degrees of freedom, the local control of forces by microprocessor 26 may not be necessary in the present invention to provide the desired quality of forces.

Local memory 27, such as RAM and/or ROM, is preferably coupled to microprocessor 26 in interface device 14 to store instructions for microprocessor 26 and store temporary and other data. For example, force profiles can be stored in memory 27, such as a sequence of stored force values that can be output by the microprocessor, or a look-up table of force values to be output based on the current position of the user object. In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In embodiments using the USB communication interface, timing data for microprocessor 26 can be alternatively retrieved from the USB signal.

In the preferred embodiment, sensors 28, actuator 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensor 28, and actuator 30.

Sensors 28 senses the position, motion, and/or other characteristics of a user object 34 of the interface device 14 along one or more primary degrees of freedom and provide signals to microprocessor 26 including information representative of those characteristics. Herein, the term "primary" degree of freedom or "primary" axis refers to the degrees of freedom which are sensed to control a graphical object or entity implemented by computer system 12. For example, the planar degrees of freedom of a mouse or the two rotary degrees of freedom of a standard joystick are primary degrees of freedom. A twisting third degree of freedom of some joysticks can also be considered a primary degree of freedom. Typically, a sensor 28 is provided for each primary degree of freedom along which object 34 can be moved. For example, in a joystick or mouse, each of sensors 28 senses the position of the user object 34 in a degree of freedom of motion. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. A suitable optical encoder is the "Softpot" from U.S. Digital of Vancouver, Wash. Linear optical encoders, potentiometers, optical sensors, velocity sensors, acceleration sensors, strain gauge, or other types of sensors can also be used, and either relative or absolute sensors can be provided.

Sensors 28 provide an electrical signal to an optional sensor interface 36, which can be used to convert sensor signals to signals that can be interpreted by the microprocessor 26 and/or host computer system 12. For example, sensor interface 36 can receive two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. If analog sensors 28 are used, an analog to digital converter (ADC) can convert the analog signal to a digital signal that is received by microprocessor 26 and/or host computer system 12. Each sensor 28 can be provided with its own sensor interface, or one sensor interface may handle data from multiple sensors. Alternately, microprocessor 26 can perform the sensor interface functions. The position value signals can be used by microprocessor 26 and are also sent to host computer system 12 which updates the host application program and sends force control signals as appropriate. In alternate embodiments, sensor signals from sensors 28 can be provided directly to host computer system 12 as shown by bus 24', bypassing microprocessor 26.

Actuator 30 transmits forces to user object 34 of the interface device 14 in one or more directions along a non-primary degree of freedom in response to signals received from microprocessor 26. Actuator 30 can generally be of two types: an active actuator and a passive actuator. Active actuators include linear current control motors, stepper motors, pneumatic/hydraulic active actuators, a torquer (motor with limited angular range), a voice coil actuators, and other types of actuators that transmit a force to move an object. For example, an active actuator can drive a linear shaft along a linear degree of freedom. Active transducers of the present invention are preferably bi-directional, meaning they can selectively transmit force along either direction of a degree of freedom. For example, DC servo motors can receive force control signals to control the direction and magnitude of force that is produced on a shaft. A passive actuator can also be used for actuator 30; such actuators include magnetic particle brakes, friction brakes, or pneumatic/hydraulic passive actuators which can be used in addition to or instead of a motor to generate a damping resistance or friction in a degree of motion. A preferred type of actuator for use in the present invention is a linear magnetic actuator, such as a linear voice coil, linear voice magnet, or linear solenoid. Rotary actuators having output that is converted to linear force/motion can also be used.

Figure 3:
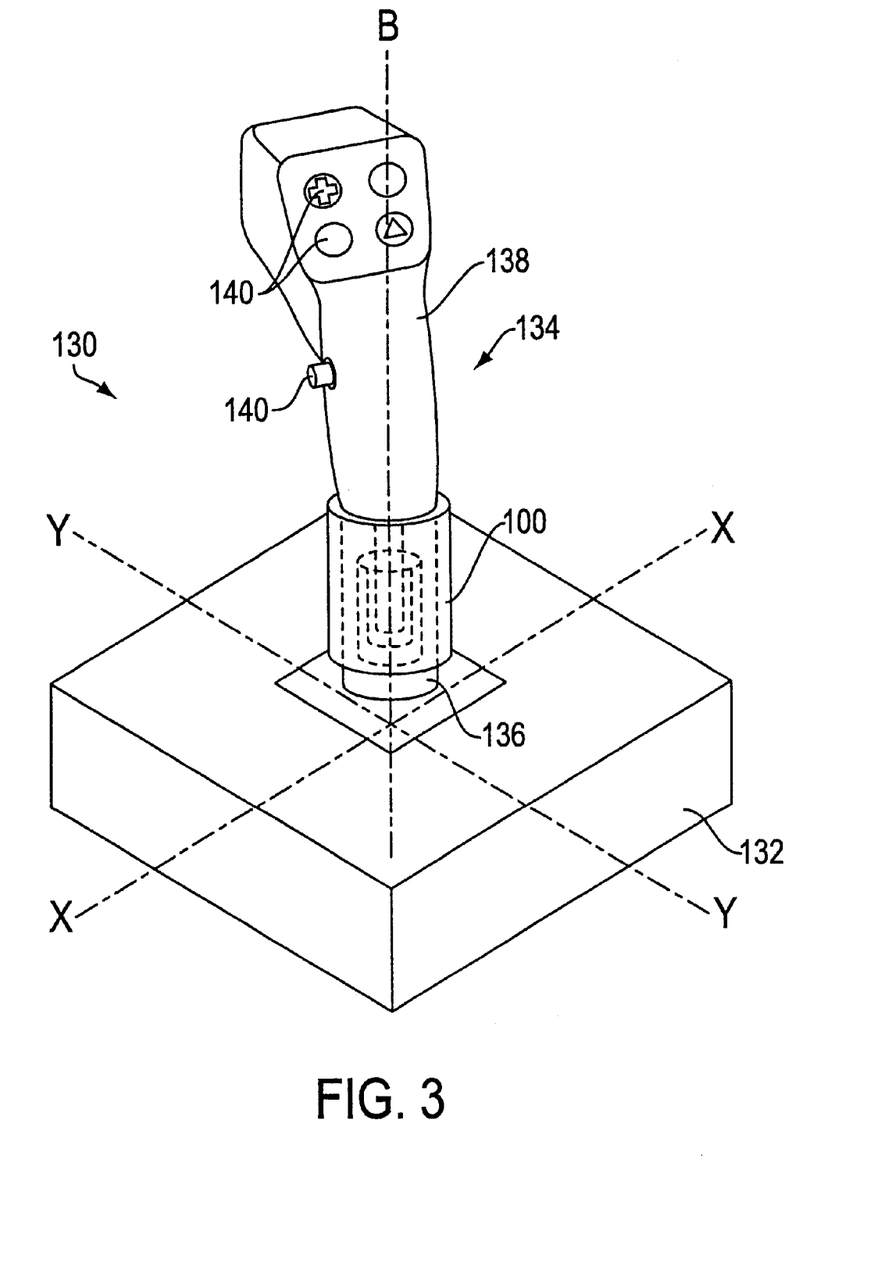
FIG. 3 is a perspective view of a joystick embodiment of the force feedback device of the present invention.
Figure 6:
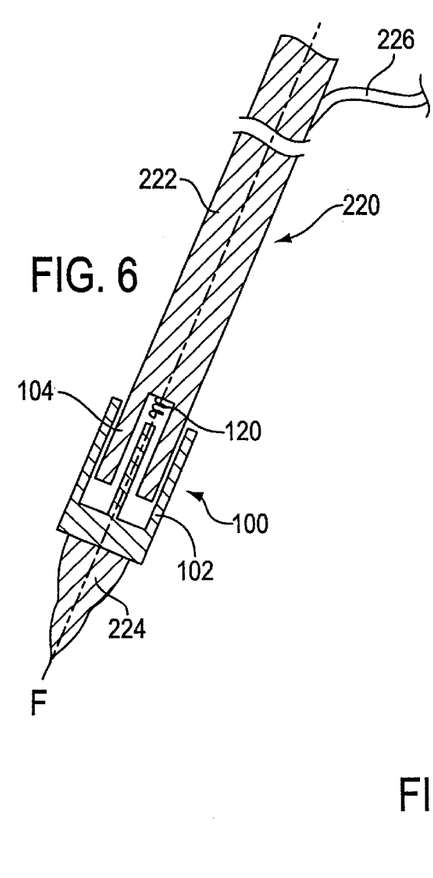
FIG. 6 is a side elevational view of a stylus embodiment of the force feedback device of the present invention.

In the preferred embodiment of the present invention, actuator 30 is provided to generate force approximately perpendicular to the degrees of freedom of motion of the user manipulatable object 34, i.e., a force is transmitted along a "non-primary" axis or degree of freedom of the user manipulatable object that is approximately perpendicular to the plane of motion of the user manipulatable object (if planar motion is provided) or that is approximately radial to the sphere or circle of motion of the user manipulatable object (if spherical motion is provided). The actuator 30 can apply force along the lengthwise ("in-line") axis of the user object itself in the case of a joystick or stylus (FIGS. 3 and 6, below). Thus, the actuator 30 does not generate force in the primary degrees of freedom of motion of the user object, but instead provides "informative" or "effect" forces that do not resist or assist motion. These forces are preferably provided in an unsensed degree of freedom that is not used to control a host-implemented graphical object/entity or provide user-controlled data to the host computer. The sensors 28 detect the position/motion of the user object 34 in its primary degrees of freedom, and this sensing is in no way affected by the output of forces by actuator 30. This configuration allows the actuator 30 to be included in force feedback device 14 at much less cost, since only one actuator 30 need be provided. Furthermore, in the preferred embodiments, actuator 30 is provided in a direct-drive system, i.e. a system in which the actuator outputs forces directly to the user manipulatable object, where no transmission system need be employed between actuator and user object. This further reduces the cost of the force feedback device since no complex transmission system need be manufactured and assembled in the device. Examples of embodiments utilizing actuator 30 are described below. Alternate embodiments can employ additional actuators for providing forces in the degrees of freedom of the user object 34. Other alternate embodiments might employ an additional sensor to sense motion of the user object (or portion of the user object) that can move in the linear, non-primary degree of freedom.

Actuator interface 38 can be optionally connected between actuator 30 and microprocessor 26. Interface 38 converts signals from microprocessor 26 into signals appropriate to drive actuator 30. Interface 38 can include power amplifiers, switches, digital to analog controllers (DACs), analog to digital controllers (ADCs), and other components, as is well known to those skilled in the art. In alternate embodiments, interface 38 circuitry can be provided within microprocessor 26, in actuator 30, or in host computer 12.

Other input devices 39 can optionally be included in interface device 14 and send input signals to microprocessor 26 or to host processor 16. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuator 30 to provide electrical power to the actuator. Power supply 40 can be included within the housing of interface device 14, or be provided as a separate component. Alternatively, if the USB or a similar communication protocol is used, interface device 14 and actuator 30 can draw power from the USB and thus have no need for power supply 40. Also, power from the USB can be stored and regulated by interface device 14 and thus used when needed to drive actuators 30. For example, power can be stored over time in a capacitor or battery and then immediately dissipated to provide a jolt force to the user object 34.

Safety switch 41 is optionally included in interface device 14 to provide a mechanism to allow a user to deactivate actuator 30, or require a user to activate actuator 30, for safety reasons. In the preferred embodiment, the user must continually activate or close safety switch 41 during operation of interface device 14 to enable the actuator 30. If, at any time, the safety switch is deactivated (opened), power from power supply 40 is cut to actuator 30 (or the actuator is otherwise disabled) as long as the safety switch is opened. For example, one embodiment of safety switch is an optical switch located on user object 34 or on a convenient surface of a housing of interface device 14. The switch is closed when the user covers the optical switch with a hand or finger, so that the actuator 30 will function as long as the user covers the switch. Safety switch 41 can also provide a signal directly to host computer 12. Other types of safety switches 41 can be provided in other embodiments, such as an electrostatic contact switch, a button or trigger, a hand weight safety switch, etc. If the safety switch 41 is not provided, or is coupled to the microprocessor, actuator interface 38 can be directly coupled to actuator 30.

User manipulable object 34 ("user object" or "manipulandum") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, sphere, medical instrument (laparoscope, catheter, etc.), pool cue, hand grip, knob, button, or other article. Also, additional mechanical structures may be included in interface device 14 to provide object 34 with desired (primary) degrees of freedom. Examples of mechanisms are described in U.S. Pat. Nos. 5,731,804, 5,721,566, 5,805,140, 5,825,308 and application Ser. Nos. 08/709,012, and 08/965,720, all incorporated by reference herein.

Figure 2:
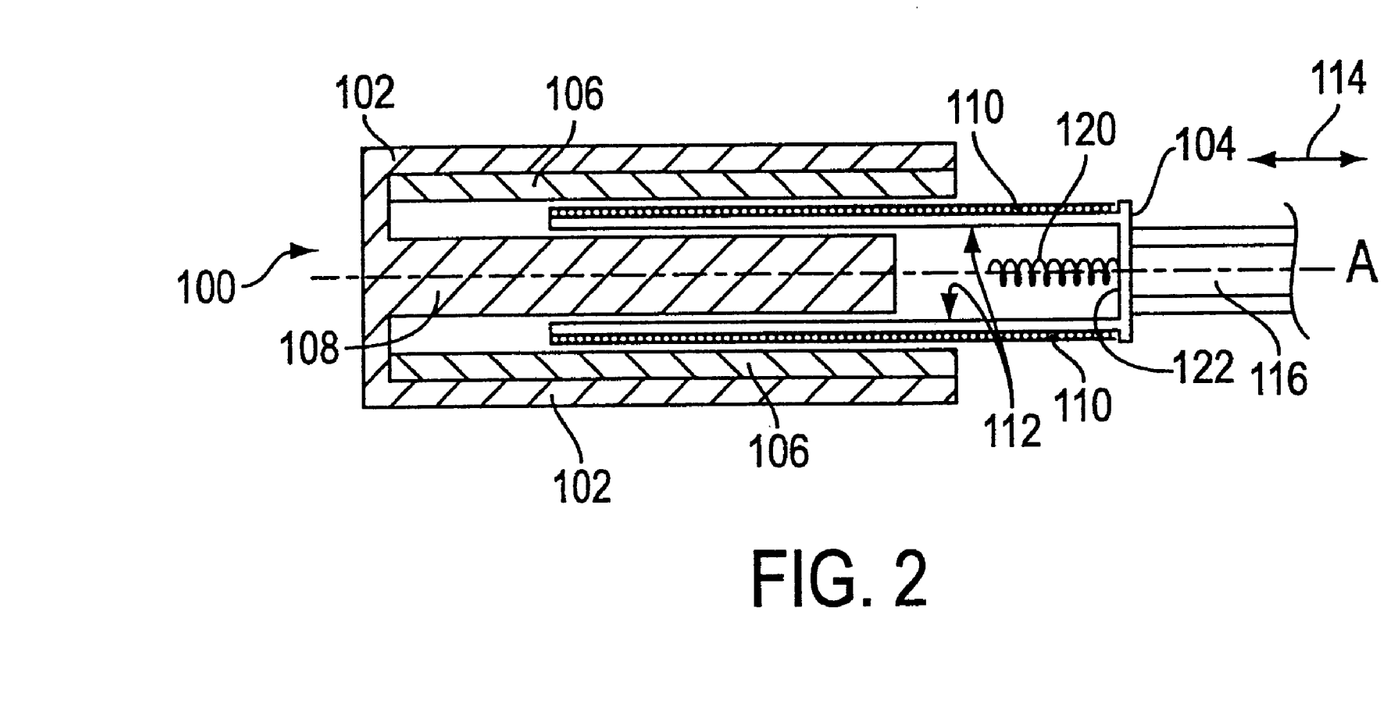
FIG. 2 is a side elevational view of a linear voice coil actuator suitable for use with the present invention.

FIG. 2 is a side sectional view of an example of a linear voice coil actuator 100 suitable for use with the present invention. Linear voice coil actuator 100 is a grounded actuator and includes a cylindrical magnetic flux housing 102 and a coil head 104. Housing 102 can be made of iron or other ferrous metal and includes a radially polarized, tubular magnet 106 (which, alternatively, can be made up of multiple, smaller magnets) positioned along the inside length of the housing and which are radially magnetized. In addition, a core portion 108 of housing 102 preferably extends down the center of housing 102 through the center of coil head 104. The housing 102, head 104, and core portion 108 can be other than cylindrically-shaped in other embodiments; for example, rectilinear or other shapes can be provided.

Coil head 104 includes a coil 110 which is wrapped around the coil head. An optional coil support 112 can be provided around which to wrap coil 110. The coil head 104 moves within the housing 102 along a linear degree of freedom, indicated by arrows 114, when an electric current is flowed through coil 110. As is well known to those skilled in the art, the electric current in the coil generates a magnetic field. The magnetic field from the coil then interacts with the magnetic fields generated by magnet 106 to produce a force and a relative motion between coil head 104 and housing 102 in a degree of freedom along axis A, as shown by arrows 114. The magnitude or strength of the force is dependent on the magnitude of the current that is applied to the coil. Likewise, the direction of the force depends on the direction of the current in the coil. In other embodiments, the coil head 104 can be made longer than the housing 102. Linear voice coil actuators are well known to those skilled in the art and are described in *Precision Machine Design*, by Alexander Slocum, Prentice Hall, 1992, page 64, and in U.S. Pat. No. 5,805,140, which are both incorporated by reference herein.

Thus, by applying a desired current magnitude and direction, force can be applied between the coil head 104 and the housing 102. In some embodiments, housing 102 is grounded, and coil head 104 is biased to move (shown in FIG. 2); in other embodiments, coil head 104 can be grounded, and housing 102 is biased to move (whether actual movement of the head 104 or housing 102 occurs depends on whether an opposing force from the user or other source is applied to the moving portions, which may hinder or prevent movement). When the moving portion of the actuator moves away from the other portion, the actuator extends, and when the moving portion moves toward the other portion, the actuator contracts. A moving portion 116 of user object 34 is coupled to the moving portion of the actuator 30, so that the moving portion 116 of the user object 34 is moved by the force applied by the actuator.

A spring 120 can optionally be included in actuator 100. For example, spring 120 can be coupled to the inside surface 122 of coil head 104 and compress when the surface 122 moves toward the inner core portion 108 of the housing 102. Spring 120 is provided to bias the actuator toward an extended position. This can be useful in some embodiments in which the actuator is desired to be in a non-compressed neutral position when no force is applied to the user object. For example, if the user object is coupled to coil head 104, the user object should have some distance along axis A to compress from a rest or neutral position. The spring 120 biases the user object toward a neutral position near the center of the degree of freedom. Spring 120 can be a physical, mechanical spring or may be a "magnetic spring", i.e. a number of magnets that provide a repulsive magnetic field to cause a bias force toward a centered or neutral position. Alternatively, other types of springs can be used, such as air or other fluid compression with valves, etc.

In other embodiments, different types of actuators can be used. For example, linear voice magnet, linear solenoid, DC current controlled linear motor, a linear stepper motor controlled with pulse width modulation of an applied voltage, a pneumatic/hydraulic actuator, a torquer (motor with limited angular range), etc. Also, passive actuators can be used, such as magnetic particle brakes or fluid-controlled passive actuators. In yet other embodiments, linear force and motion in the non-primary degree of freedom can be achieved through the use of a rotary actuator, e.g. a rotary actuator outputs a torque in a rotary degree of freedom on shaft, which is converted to linear force and motion through a transmission, as is well known to those skilled in the art.

FIG. 3 is a perspective view of a first embodiment 130 of a force feedback device 14 of the present invention. Force feedback device 130 includes a joystick base 132 and a joystick handle 134. Base 132 preferably includes most of the electrical components of the device 130, such as the microprocessor 26, sensors 28, sensor interface 36, power supply (if any), etc. Handle 134 preferably includes a base portion 136 and a grip portion 138. The base portion 136 is coupled to a mechanism (not shown) that allows the base portion 136 to move in two primary degrees of freedom, forward/back and left/right. Typically, these degrees of freedom are rotational degrees of freedom, such as about axes X and Y, where the axis B extends through the length of joystick handle 134 is radial with respect to a spherical workspace of the joystick moving in the two rotary degrees of freedom, i.e. the joystick is moved as if on a portion of the surface of a sphere, where the axis B extends out of the surface of the sphere. The primary degrees of freedom of the joystick can be linear degrees of freedom in other embodiments.

Actuator 30 is preferably coupled between the base portion 136 and the grip portion 138. With reference to the actuator 100 shown in FIG. 2, the base portion 136 can be coupled to the coil head 104 while the grip portion 138 can be coupled to the housing 102. Alternatively, the position of the housing and coil portions can be reversed. The grip portion 138 thus may be moved relative to the base portion 136 due to the allowed movement of the coil head 104 with respect to the housing 102 of actuator 100. The amount of movement allowed depends on the dimensions of the actuator 100 used and any other factors such as stops provided to prohibit movement outside a particular range. Since the base portion 136 preferably cannot be moved along axis B, the base portion 136 is considered grounded with respect to the axis B. The microprocessor 26 can send signals to actuator 100 to cause force to be applied in either direction in the (non-primary) degree of freedom of axis B, which may physically move the grip portion 138 along axis B if sufficient force is output (and if an active actuator is used for actuator 100). The grip portion 138 thus may extend or compress relative to the base portion 136. Buttons and switches 140 are typically provided to allow the user to input additional signals to the microprocessor 26 and host computer 18 (wires from any buttons on handle 134 can be routed through or around the actuator 100). In other embodiments, the size of the grip portion and base portion can be altered. For example, the base portion 136 can be made longer, while the grip portion 138 can be made shorted such that the user is grasping both portions when holding the joystick handle 134 in a normal fashion.

Any number of different force sensations can be output on grip portion 138 using actuator 100. For example, a jolt sensation can be output, which is a single impulse of force that quickly rises to the desired magnitude and then is turned off or quickly decays back to zero or small magnitude. A vibration can also be output, which is a time-varying force that is typically periodic, e.g. a force vs. time waveform that is shaped like a sine wave, triangle wave, or sawtooth wave. The vibration causes the grip portion 138 to oscillate back and forth on axis B, and which can be output by the microprocessor to simulate a particular effect that is occurring in a host application. For example, the vibration can be output when a user-controlled racing car is driving on a dirt shoulder of a displayed road. A constant force can also be output on the user object. This is a force having a constant magnitude that is output for a specified period of time or until a condition occurs, such as a user-controlled cursor or graphical object being moved to a predefined location in a displayed graphical environment.

Another type of force sensation that can be output by actuator 100 is a texture force. This type of force is similar to a repeating jolt force that depends on the position of the user object in its primary (sensed) degrees of freedom. For example, a particular rectangular window area in a graphical user interface can be associated with a texture having bumps spaced at a predetermined distance apart over the area of the window. As the joystick moves a cursor over the window and over each bump, a force impulse is output. This type of force is spatially-dependent, i.e. a force is output depending on the sensed position of the joystick as it moves over a designated textured area; when the joystick is positioned between "bumps" of the texture, no force is output, and when the joystick moves over a bump, a force is output. Other spatial force sensations can also be output. In addition, any of the described force sensations herein can be output by actuator 100 simultaneously or otherwise combined as desired. Although these forces are not provided in the primary forward/back and left/right degrees of freedom of the joystick, the forces of the present invention can add to the user's haptic experience of a computer environment in a cost effective way.

The spring 120 can also be included in or in conjunction with actuator 100, for example, to bias the grip portion 138 toward an extended rest position. This spring provides a counter-force to the force applied to the grip portion by the user's hand, and allows the grip portion to be fully extended and provide for a user's grip.

Figure 4:
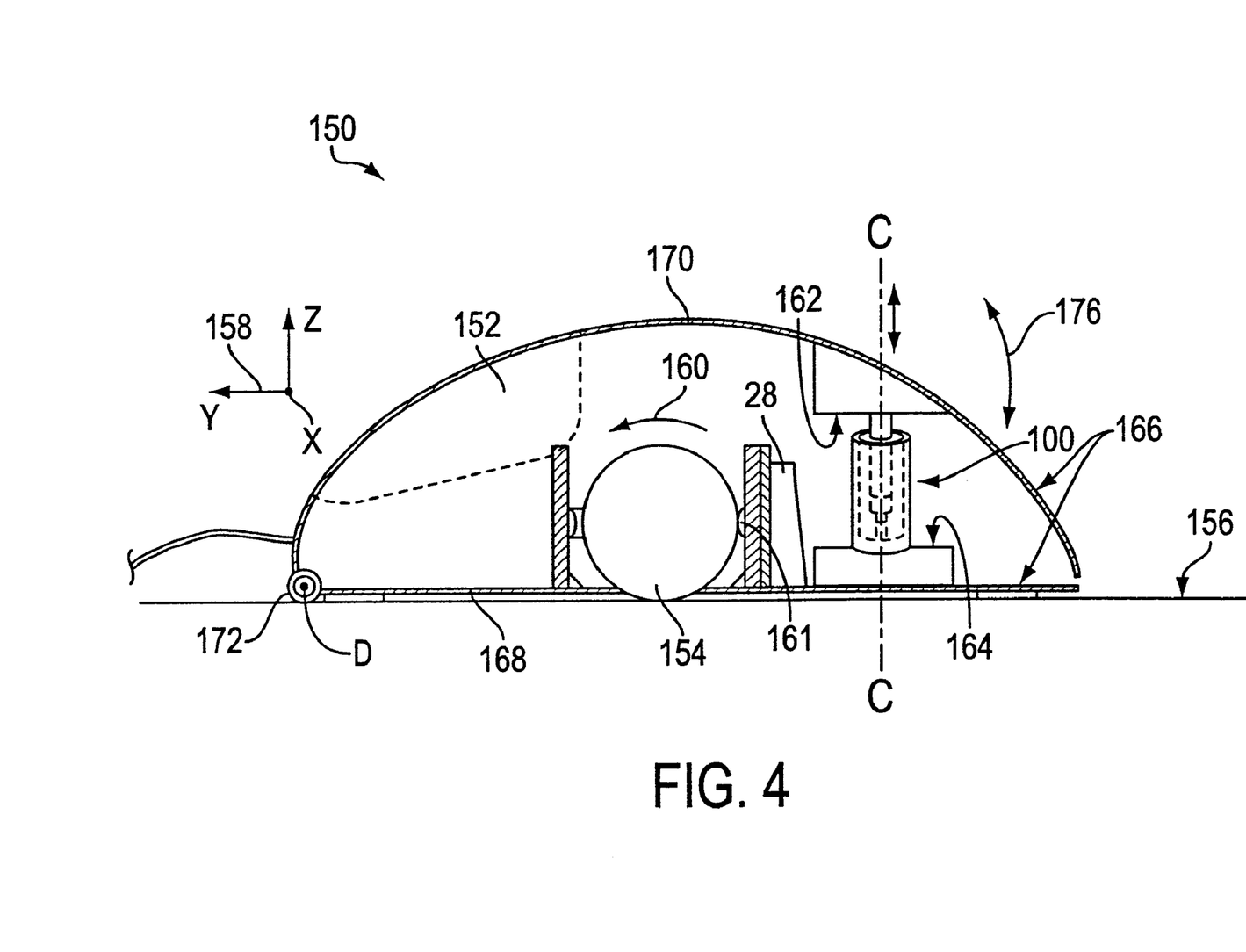
FIG. 4 is a side elevational view of a mouse embodiment of the force feedback device of the present invention.

FIG. 4 is a side elevational view of a second embodiment 150 of a force feedback device 14 of the present invention. Device 150 is in the form of a mouse which is normally used by users to provide planar two-dimensional input to a computer system to control a cursor in a graphical environment or alternatively to control a virtual character, vehicle, or other entity. Like most computer mice, mouse 150 includes a number of buttons 152 which are selected by the user when the user wishes to input a command gesture or the like to the computer system. Mouse 150 also includes a standard mouse ball 154 for providing directional input to the computer system. Ball 154 is a sphere that extends partially out the bottom surface of the mouse and rolls in a direction corresponding to the motion of the mouse on a planar surface 156. For example, when the mouse 150 is moved in a direction indicated by arrow 158 (y direction), the ball rotates in place in a direction shown by arrow 160. The ball motion is tracked by a cylindrical roller 161 which is coupled to a sensor 28 for detecting the motion of the mouse. A similar roller and sensor 28 is used for the x-direction which is perpendicular to the y-axis. Other types of mechanisms for detecting planar motion of the mouse 150 can be used in other embodiments; for example, a sensor can be built into the surface 156 to detect the position of an emitter or transmitter in mouse 150 and thus detect the position of the mouse 150 on the surface 156.

Mouse 150 of the present invention also preferably includes actuator 100 for providing forces in a direction along an axis C, which is approximately parallel to the z-axis. Axis C preferably extends approximately normal to the planar surface 156 so that forces are provided perpendicularly to the plane of motion of the mouse 150. Actuator 100 is preferably a linear electromagnetic actuator as described with reference to FIG. 2, but can be other types of actuators in other embodiments. Actuator 100 outputs a force along axis C which causes motion in the same direction along axis C.

For the user to feel the force output by actuator 100 effectively, the mouse 150 is provided with a housing 166 that includes two portions, a base portion 168 and a cover portion 170. The base portion 168 is positioned approximately parallel to the ground surface 156 and acts as the bottom of the mouse 150. The cover portion 170 is coupled to the base portion 168 by a hinge 172, where the cover portion is not attached to the base portion at any location except for the hinge 172. Hinge 172 allows the cover portion 170 to rotate about axis D with respect to the base portion. Thus, the end 174 of the cover portion can pivot away from the base portion 168 as shown by arrow 176. Hinge 172 can be implemented in a variety of ways; for example, a cylindrical, rotatable hinge can be provided; or, a flexible material can be provided between portions 170 and 168 to allow the relative motion between the base and cover portions. Movable cover portion 170 can include the entire portion of the mouse contacted by the user in normal operation, or can be a portion of the grasped area; for example, the left and right sides of the mouse may be coupled to base portion 168 while only the top surface of the mouse is part of cover portion 170. The user's hand can grasp the sides of the mouse but a significant portion of the hand will rest on the cover portion 170 and thus feel any forces output on the cover portion 170.

Actuator 100 is positioned between two members 162 and 164 provided inside mouse 150, near the end of the mouse opposite to hinge 172. Member 162 is rigidly coupled to cover portion 170, and member 164 is rigidly coupled to base portion 168. The coil portion 104 of actuator 100 can be coupled to member 162, while the housing portion 102 of the actuator can be coupled to member 164 (these positions can be reversed in alternate embodiments). This configuration allows the actuator 100 to output a linear force that moves the member 162 and cover portion 170 relative to the member 164 and base portion 168 about axis D. The actuator can output a force in an up direction on axis C, thus causing the cover portion 170 to move away from base portion 168; or a force in a down direction can be output, forcing the two portions 170 and 168 closer together (if they are apart). The actuator 100 can be placed near the rear of the mouse 150, as shown, to cause the rear portion to move; or, the actuator 100 can be placed near the front of the mouse and the hinge 172 at the rear to cause the front end of the mouse 150 to move. In some embodiments, the actuator 100 also includes a physical spring 120 which biases the actuator to a partially- or fully-extended position and thus prevents the cover portion from resting in a "compressed" position (in those embodiments where the neutral or rest position of the cover portion is at a position some distance above the base portion). In an alternate embodiment, the actuator 30 can be a rotary actuator that outputs a rotational force (torque) on hinge 172 to cause rotary motion about axis D, thereby moving the cover portion 170 about axis D similarly to the linear actuator embodiment described above.

The force sensations which can be output using actuator 100 can take a variety of forms.

As discussed with respect to FIG. 3, jolts and vibrations can be output when the microprocessor 26 or host computer 12 sends the appropriate signals to the actuator 100. The jolts and vibrations can indicate various features of the graphical environment on the host computer to the user. For example, a vibration can be output while a user-controlled cursor is positioned inside the boundary of an icon or other graphical object in a graphical user interface. The force is applied to the entire portion of the mouse grasped by the user, e.g. the entire cover portion 170. Since the entire cover portion 170 may move or be biased with the output force, rather than just a small area of the mouse's surface, the user's entire hand on mouse 150 feels the jolt, vibration, constant force, or texture.

The mouse embodiment 150 allows the user to interact with a graphical environment through the sense of feel. The output of forces can be coordinated with events occurring in the graphical environment. For example, when the user moves a cursor over a window in a graphical user interface, a jolt can be output by actuator 100 as the cursor moves over a boundary of the window. Furthermore, the magnitude of output forces can depend on the event in the graphical environment. For example, the force jolt can be a different magnitude of force depending on the type of graphical object encountered by the cursor. For example, a jolts of higher magnitude can be output when the cursor moves over windows, while jolts of lower magnitude can be output when the cursor moves over icons. The magnitude of the jolts can also depend on other characteristics of graphical objects, such as an active window as distinguished a background window, file folder icons of different priorities designated by the user, icons for games as distinguished from icons for business applications, different menu items in a drop-down menu, etc. In games or simulations, the magnitude of jolts can be based on the severity of a collision or explosion, the size of the controlled graphical object or entity (and/or the size of a different graphical object/entity that is interacted with), the velocity or acceleration of the user object, etc. Similarly, different-magnitude vibrations can be output depending on the type of graphical object the cursor is moved over or depending on other characteristics of graphical objects. Different-magnitude constant forces can also be output depending on such characteristics. Finally, different magnitudes of textures and/or different spacings between the bumps of textures can be output depending on different characteristics of objects and entities encountered in the graphical environment. Different magnitudes of other force sensations can be similarly used. The above-described differences in force sensations can be applied to all the embodiments disclosed herein.

The mouse embodiment 150 also allows the user to feel a simulated 3-D surface while moving the mouse in its planar workspace. For example, the user can be moving the mouse 150 on surface 156 to move a cursor or other user-controlled graphical object over a spatial "landscape" that is represented by an overhead view of the landscape on display screen 20. For example, a contour map can be displayed on the display device 20. As the cursor moves over a hill of the displayed landscape, the actuator 100 is controlled to output a force that moves the end of the mouse 150 about axis D (or along axis C) by a specified distance that approximately corresponds to the height of the hill (or outputs a force having a magnitude proportional to the height of the hill). When the cursor is moved over an area that is at a lower elevation, the actuator 100 is controlled to move the cover portion 170 of the mouse 150 down to a lower level. In this way, the user can both perceive elevation changes visually by the use of contour lines, and can experience the elevation changes through the sense of feel by the distance that cover portion 170 is moved in the non-primary degree of freedom. For visual maps that do not make elevation changes obvious, the forces output by actuator 100 can provide information to the user that is not easily available through other senses. The use of actuator 100 for providing motion in the non-primary degree of freedom for a simulated 3-D surface can also be used in connection with other applications, such as a CAD 3-D drawing, a game, or even to indicate information in a word processor or spreadsheet.

Figure 5:
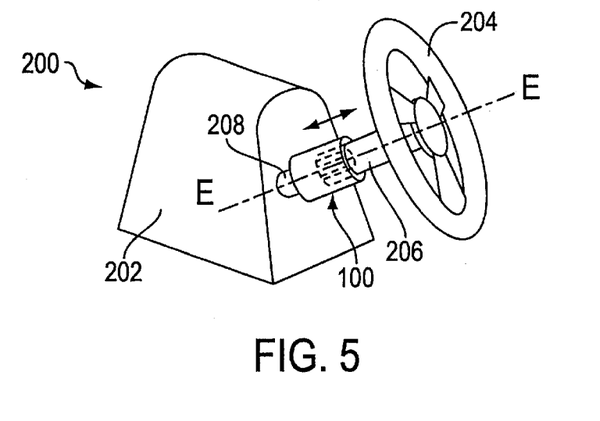
FIG. 5 is a perspective view of a steering wheel embodiment of the force feedback device of the present invention.

FIG. 5 is a perspective view of a third embodiment 200 of a force feedback device 14 of the present invention. Device 200 includes a base 202 and a rotatable wheel 204 coupled to the base 202. Wheel device 200 is typically used in conjunction with graphical racing games or other games in which a vehicle is controlled by the player. Any portion of the rim of wheel 204 is typically grasped by the hands of the user to turn the wheel during such games. Sensor 28 is provided in base 202 to detect the rotational position or motion of wheel 204. In the described embodiment, actuator 30 (shown as actuator 100) is provided between the wheel shaft 206 and the base 202. For example, the shaft 206 coupled to wheel 204 can be coupled to the housing 102, while the base shaft 208 that is coupled to base 202 and sensor 28 is coupled to the coil head 104 of the actuator 100. Actuator 100 can output linear forces along axis E, which extends through the center of rotation of the wheel 204, approximately perpendicular to the plane of rotation of the wheel.

Actuator 100 provides force sensations to the user grasping wheel 204 similarly to the sensations described above with respect to the embodiments of FIGS. 3 and 4. For example, vibration or jolt forces can be output in the non-primary degree of freedom along axis E when the user is controlling a vehicle on a simulated bumpy road. Texture forces can be output along axis E, dependent on a simulated velocity and trajectory of a controlled vehicle. A spring 120 can be provided in the actuator 100 to bias the wheel 204 to a resting position, similarly to the joystick of FIG. 3. As described above, if actuator 100 is the only actuator used in device 200 and no forces are output in the rotary degree of freedom of the wheel 204 about axis E, the cost of the device can be significantly reduced.

FIG. 6 is a side elevational view of a stylus embodiment 220 of the force feedback device of the present invention. The stylus 220 can be used as a pointing device to input coordinates to host computer 18. For example, the stylus 220 can be used in conjunction with a tablet that detects the point of contact between the stylus and the tablet or the position of the stylus over the tablet. The coordinates of the point of contact can be provided to the host computer to control a graphical "pen" in a drawing program or to control a cursor, as is well known to those skilled in the art. Other stylus embodiments may use a sensor in the stylus for providing coordinates in some defined reference plane or volume, and thus no tablet may be required. Several embodiments of stylus devices are well known to those skilled in the art and can be used in the present invention. Preferably, the stylus for use with the present invention does not have a mechanical linkage coupled to it to sense its motion, although such a linkage can be used in alternate embodiments.

Stylus 220 includes a body portion 222 and a tip portion 224. The user may grasp the body portion 222 and write or point with the stylus like a normal pen-like instrument. Alternatively, the user can grip the stylus 220 at the tip portion 224 and/or at actuator 100. Actuator 30 (shown as actuator 100) couples the tip portion 224 with the body portion 222. As shown, the body portion 222 is coupled to the coil head 104 of the actuator 100, while the tip portion is coupled to the housing 102. These positions can be reversed in alternate embodiments. The body and tip portions thus may extend relative to each other, and the actuator 100 can output force along the lengthwise axis F which extends along the length of the stylus 220. The actuator 100 may also include spring 120 to bias the tip and body portions to an extended neutral position. In one embodiment, the force sensations output by actuator 100 can be made sufficiently low in magnitude to allow the power source for the actuators to be placed inside the stylus 220. For example, batteries can be provided to source power for actuator 100. Alternatively, a cord 226 or other transmission device can be used to supply power to actuator 100 from a separate power supply.

The actuator 100 can be controlled to output the various force sensations described above when the user is using the stylus. For example, vibrations, jolts, constant forces, or textures can be output when the user moves the stylus tip over areas corresponding to particular regions in a graphical user interface or other graphical environment. A 3-D landscape similar to that described above for the mouse embodiment 150 can also be used with stylus 220, where areas of higher elevation can correspond with the actuator 100 moving the body portion 222 away from the tip portion 224 for a distance corresponding to the amount of elevation.

Figure 7:
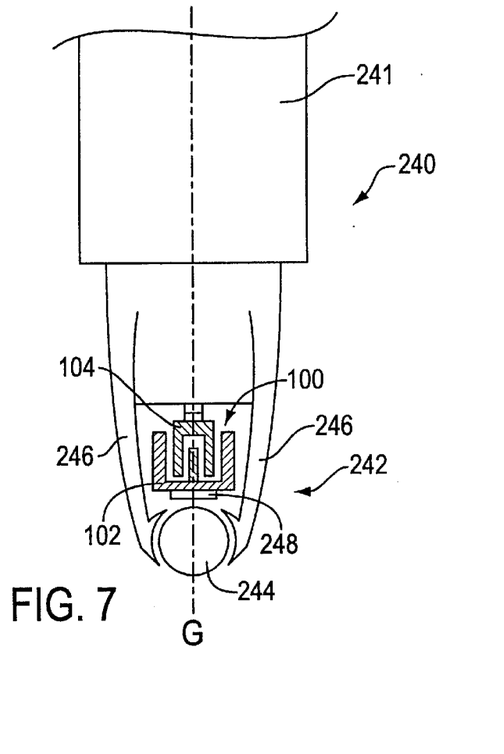
FIG. 7 is a side elevational view of a different stylus embodiment of the force feedback device of FIG. 6.

FIG. 7 is a side elevational view of an embodiment 240 of the stylus 220 of FIG. 6. The embodiment 240 includes a standard body portion 241 and a different stylus tip 242 which includes a rotatable ball 244, e.g. similar to a ball used in a standard ball-point pen. The ball 244 is positioned between two supports 246 which hold the ball in place but allow the ball to rotate while maintaining a constant spatial position. Next to the ball 244 is actuator 100, which is coupled to the stylus 240. In the embodiment shown, the coil head 104 is coupled to the stylus 240 while the housing 102 is coupled only to the coil head 104. A brake pad 248 is also coupled to the housing 102 of the actuator.

When the user wishes to use the stylus normally, the user moves the tip of the pen across a surface. Since the ball 244 is the only portion of the tip contacting the surface in typical operation, this motion causes the ball 244 to roll to allow a fluid motion of the stylus over the surface. The contact of the ball with a tablet surface can be sensed by a sensor in the tablet, for example. When a force sensation is to be output, the actuator 100 is controlled to extend, i.e. the housing 102 and brake pad 248 are commanded to move and contact the ball 244. This causes a resistance to the motion of the ball 244 and can cause the ball to stop rolling. If the actuator 100 is commanded to quickly move the brake pad 248 against the ball 244 with maximum force, a jolt-like effect is felt by the user. If the brake pad is more gradually contacted with the ball, the user may feel an increasing resistance or damping-like effect. If the actuator is commanded to pulse so that the brake pad 248 continuously is contacted with the ball 244 and then withdrawn at a high frequency, a vibration-like effect is felt by the user. In some embodiments, a solenoid is a suitable low cost embodiment for actuator 100 in the embodiment 240 since the solenoid can be readily adapted to move the pad 248 against the ball 244.

While this invention has been described in terms of several preferred embodiments, it is contemplated that alterations, permutations and equivalents thereof will become apparent to those skilled in the art upon a reading of the specification and study of the drawings. For example, many different types of forces can be provided with the actuator of the present invention. Several different types of user manipulatable objects can be provided in the present invention, not limited to the embodiments described herein. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A force feedback mouse device coupled to a host computer system implementing a host application program, the mouse device comprising:

a mouse housing physically contacted by a user and movable in physical space in at least two degrees of freedom with respect to a ground, wherein a cover portion of said mouse housing is movably coupled to a base portion of said mouse by at least one hinge and wherein said user contacts said cover portion with a palm of a hand of said user, said cover portion including at least a portion of a top surface of said mouse housing;

at least one sensor operative to detect said movement of said mouse in physical space in two degrees of freedom with respect to said ground and to output sensor signals representative of said movement, said two degrees of freedom being approximately within a single plane; and an actuator coupled to said mouse housing and operative to apply a linear output force in a direction approximately perpendicular to said single plane, said force applied along an axis extending through said mouse to said cover portion of said mouse housing rested upon by said hand of said user such that said cover portion is moved with respect to said base portion.

2. A force feedback mouse device as recited in claim 1 wherein one end of said cover portion is moved with respect to said base portion.

3. A force feedback mouse device as recited in claim 2 wherein said cover portion of said mouse moves as a result of receiving said force, wherein said movement is not sensed by said force feedback interface device.

4. A force feedback mouse device as recited in claim 2 wherein said actuator moves said cover portion of said housing in said direction approximately perpendicular to said plane, wherein said cover portion is a substantial portion of a top surface of said mouse housing.

5. A force feedback mouse device as recited in claim 4 wherein said cover portion is rotatable coupled to said base portion such that said cover portion moves approximately rotationally with respect to said base portion.

6. A force feedback mouse device as recited in claim 5 wherein said cover portion is coupled to said base portion by a mechanical hinge.

7. A force feedback mouse device as recited in claim 4 wherein said output force is correlated with a graphical representation displayed by said host computer system, wherein a position of said mouse housing in said plane corresponds with a position of a cursor displayed in said graphical representation.

8. A force feedback mouse device as recited in claim 7 wherein said output force is a jolt correlated with the interaction of said user-controlled cursor with a graphical object displayed in a graphical user interface.

9. A force feedback mouse device as recited in claim 8 wherein said jolt is output with a magnitude dependent on a characteristic of said graphical object with which said cursor interacts.

10. A force feedback mouse device as recited in claim 9 wherein said characteristic of said graphical object is a type of said graphical object, wherein said type includes one of an icon, a window, and a menu item.

11. A force feedback mouse device as recited in claim 7 wherein said graphical representation includes a representation of a 3-D area having more than two elevations, and wherein said output force is correlated with an elevation of a portion of said graphical representation on which said cursor is displayed.

12. A force feedback mouse device as recited in claim 1 wherein said actuator is a linear actuator.

13. A force feedback mouse device as recited in claim 12 wherein said linear actuator is a voice coil actuator.

14. A force feedback mouse device as recited in claim 1 wherein said sensor includes two sensors, each of said sensors detecting movement of said mouse housing in one of said degrees of freedom in said single plane.

15. A force feedback mouse device as recited in claim 1 wherein said force is included in a force sensation, said force sensation being one of a jolt, vibration, constant force, and texture force.

16. A force feedback mouse device as recited in claim 1 wherein said actuator outputs said force directly on said mouse housing, wherein no transmission system is provided between said actuator and said mouse housing.

17. A force feedback mouse device as recited in claim 1 further comprising a microprocessor separate from said host computer and local to said mouse device said microprocessor receiving force information from said host computer system and providing control signals to said actuator based at least in part on said force information.

18. A force feedback mouse device as recited in claim 17 wherein said microprocessor receives said sensor signal from said at least one sensor and reports sensor data based on said sensor signal to said host computer system.

19. A force feedback mouse device as recited in claim 1 wherein said cover portion includes said entire top surface of said mouse housing which which said user contacts.

20. A force feedback mouse device as recited in claim 1 wherein said moveable cover portion is a portion of a contacted area of said mouse housing, wherein a substantial portion of said hand of said user contacts said cover portion.

21. A force feedback mouse device as recited in claim 1 wherein said hinge is a flexure coupled between said base portion and said cover portion.

22. A force feedback mouse device as recited in claim 1 wherein said cover portion is rotatably coupled to said base portion, wherein said cover portion is rotated only a short distance such that said cover portion is moved approximately linearly and approximately perpendicular to said two planar degrees of freedom.

23. A tactile feedback mouse coupled to a host computer system implementing a host application program, the mouse comprising:
  a housing physically contacted by a hand of a user and movable in a plurality of degrees of freedom, two of said degrees of freedom being substantially in a single plane, wherein a cover portion of said housing is contacted by at least a portion of a palm of said hand of said user when said user operates said mouse, said cover portion being rotatably coupled to a base portion of said housing;
  at least one sensor coupled to said housing and operative to detect a position of said housing in said two planar degrees of freedom and to output a sensor signal representative of said movement;
  an actuator coupled to said housing and operative to apply a linear output force in a direction approximately perpendicular to said two planar degrees of freedom, said force applied to said cover portion of said housing rested upon by said palm of said user's hand such that said cover portion is rotated with respect to said base portion, said rotation causing a tactile sensation to said user's palm; and
  at least one button coupled to said housing that causes an input signal to be sent to said host computer system when said button is pressed by said user.

24. A tactile feedback mouse as recited in claim 23 wherein said cover portion is rotated a short distance such that said cover portion is moved approximately linearly and approximately perpendicular to said two planar degrees of freedom.

25. A tactile feedback mouse as recited in claim 23 wherein said cover portion is coupled to said base portion by a hinge.

26. A tactile feedback mouse as recited in claim 23 further comprising a microprocessor separate from said host computer system and local to said mouse, said microprocessor receiving force information from said host computer system and providing control signals to said actuator based at least in part on said force information.

27. A tactile feedback mouse as recited in claim 26 wherein said microprocessor receives said sensor signal from said at least one sensor and reports sensor data based on said sensor signal to said host computer system.

28. A tactile feedback mouse as recited in claim 23 wherein said actuator is a linear actuator.

29. A tactile feedback mouse as recited in claim 28 wherein said linear actuator is a voice coil actuator.

30. A tactile feedback mouse as recited in claim 23 wherein said at least one sensor includes two sensors, each of said sensors detecting movement of said housing in one of said degrees of freedom in said single plane.

31. A tactile feedback mouse as recited in claim 23 wherein said output force is correlated with a graphical representation displayed by said host computer system, wherein a position of said housing in said plane corresponds with a position of a user-controlled cursor displayed in said graphical representation.

32. A tactile feedback mouse as recited in claim 31 wherein said output force is a jolt correlated with the interaction of said cursor with a graphical object displayed in a graphical user interface.

33. A tactile feedback mouse as recited in claim 31 wherein said output force is a jolt or a vibration having a magnitude dependent on a characteristic of said graphical object with which said cursor interacts.

34. A tactile feedback mouse as recited in claim 33 wherein said magnitude of said jolt or said vibration is different when said cursor interacts with an active window than when said cursor interacts with a background window.

35. A tactile feedback mouse as recited in claim 33 wherein said magnitude of said jolt or said vibration is different when said cursor interacts with an icon associated with one application program than when said cursor interacts with an icon associated with a different application program.

36. A tactile feedback mouse as recited in claim 33 wherein said graphical representation is a game, and wherein said magnitude of said jolt or said vibration is based on a severity of a collision or explosion in said game.

37. A tactile feedback mouse as recited in claim 31 wherein said output force is part of a texture sensation, wherein a spacing between bumps of said texture sensation is dependent on a characteristic of a graphical object with which said cursor interacts.

38. A tactile feedback mouse as recited in claim 31 wherein said output force is a vibration that is output while said cursor is positioned inside a boundary of said graphical object.

39. A tactile feedback mouse as recited in claim 31 wherein said graphical representation includes a representation of a 3-D area having different elevations, and wherein said output force is correlated with an elevation of a portion of said graphical representation on which said cursor is displayed.

40. A tactile feedback mouse as recited in claim 31 wherein said cover portion is moved to different distances from said base portion based on a simulated elevation of an area or object displayed in said graphical representation with which said cursor interacts.

41. A tactile feedback mouse as recited in claim 23 wherein said tactile sensation is one of a vibration and texture force.

42. A method for providing tactile sensations to a user of a host computer, wherein a mouse interface device is coupled to a host computer displaying a graphical environment, the method comprising:

providing a mouse interface device that is moveable in a plurality of degrees of freedom by said user, two of said degrees of freedom being substantially in a single plane, said mouse device having a cover portion and a base portion, wherein said cover portion is coupled to said base portion by a hinge and can be moved with respect to said base portion, wherein said cover portion is physically contacted by a palm of a hand of said user;

providing sensor data to said host computer, said sensor data representing a position of said mouse device in said two planar degrees of freedom;

receiving tactile data from said host computer, said tactile data describing, at least in part, a tactile sensation to be output to said user;

causing an actuator to move said cover portion of said mouse device with respect to said base portion of said mouse device using said tactile data, said movement causing said cover portion to move approximately perpendicularly to said two planar degrees of freedom and providing said tactile sensation to said user.

43. A method as recited in claim 42 wherein said tactile sensation is a jolt or a vibration.

44. A method as recited in claim 42 wherein said user contacts said cover portion with a palm of a hand of said user, said cover portion including at least a portion of a top surface of said mouse housing.

45. A method as recited in claim 42 wherein said tactile sensation is output when a user-controlled cursor displayed in said graphical environment interacts with a graphical object displayed in said graphical environment.

* * * * *